D. R. PRATT.
RUBBER-SPRING.

No. 170,590. Patented Nov. 30, 1875.

Witnesses:
C. M. Connell
Alfred Cloughly

Inventor:
Daniel R. Pratt.
Blanchard & Singleton
his atty.

UNITED STATES PATENT OFFICE.

DANIEL R. PRATT, OF NEW YORK, N. Y.

IMPROVEMENT IN RUBBER SPRINGS.

Specification forming part of Letters Patent No. 170,590, dated November 30, 1875; application filed November, 8, 1875.

*To all whom it may concern:*

Be it known that I, DANIEL R. PRATT, of the city of New York, in the county of New York and State of New York, have invented certain new and useful Improvements in Web-Disk Rubber Springs; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The nature of my invention consists in the construction and manufacture of india-rubber car-springs, that I denominate "Web-Disk Rubber Springs," of such suitable size and dimensions as to be employed and used upon railroad-cars, where springs are needed, the inner and exterior surfaces corresponding in shape, while, at the same time, there is a solid vertical portion of the rubber that forms no part of the annular rim, externally or internally. This construction and the principle involved in it can be applied to springs having spiral rims or projections, as well as to those having annular ones.

Figure 1:
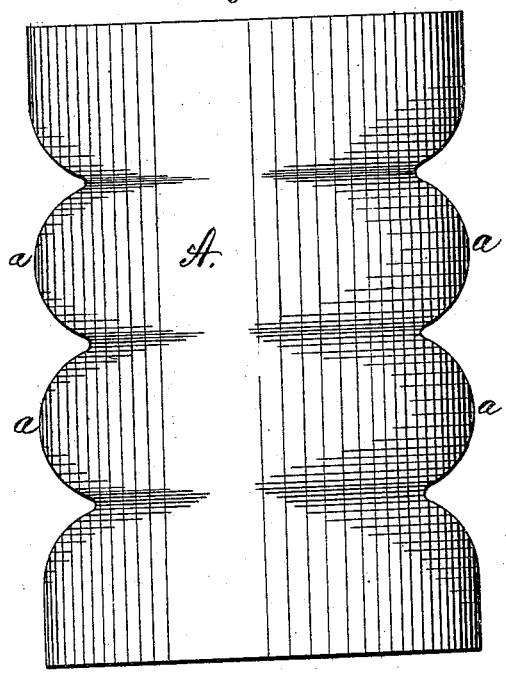
Figure 2:
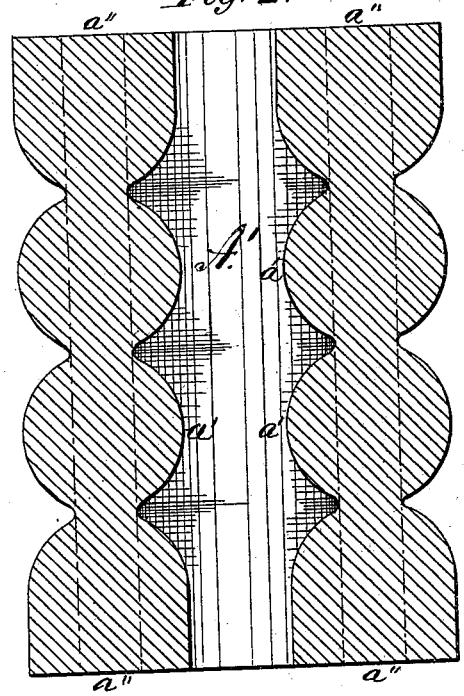
Figure 3:
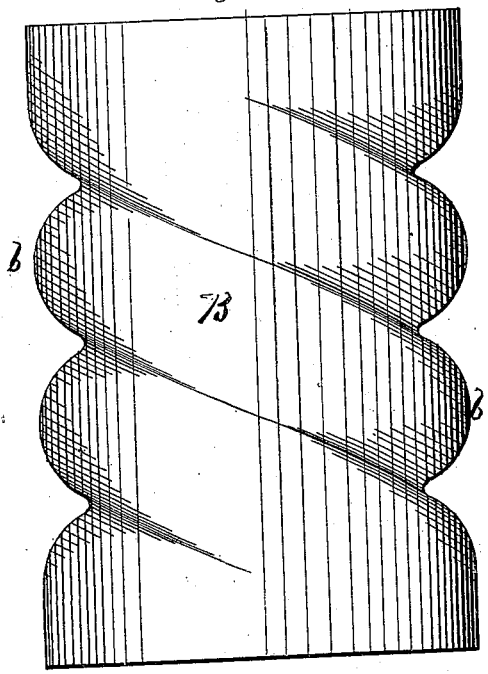
Figure 4:
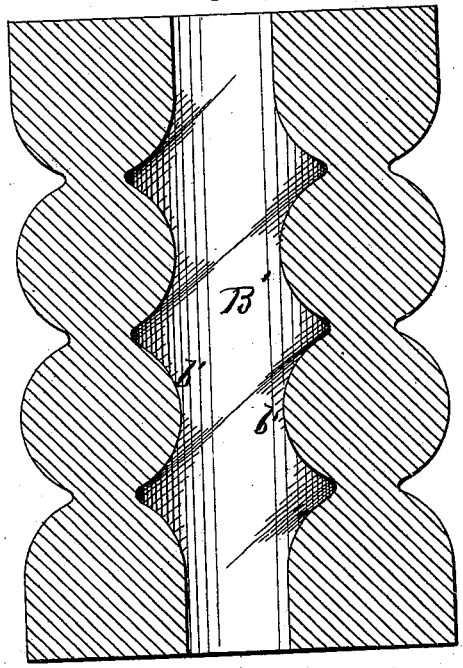

Figures 1 and 2 show the form and configuration of the spring—Fig. 1 showing the external shape, and Fig. 2 a cross-section and interior view—and Fig. 3 shows a spring that may be constructed in a spiral form, and Fig. 4 a cross-section of same, and interior view, both springs being the same in principle and mode of construction.

These springs are formed in a mold, giving them externally as well as internally the forms shown in the drawings, the ribs $a\,a$ being annular and of any desired number. The interior of such ribs are formed by means of an iron core passing centrally through the spring and has secured upon its surface, at proper distances apart, a core conforming in shape to the external rib, as is seen in Fig. 2 at $a'$. The internal core is made of plaster-of-paris, terra-cotta, or other plastic material that will adhere to the iron core, to which it is attached, retaining the proper shape until the rubber is formed around it, after which the outer portion of the core is broken up by means of slight blows upon the external portion of the spring, which causes said portion to break and crumble, so as to admit of the withdrawal of the iron core. The broken pieces of the core can then be withdrawn or removed from the spring. In order to impart strength and durability to the spring, a web, $a''\,a''$, of the india-rubber runs vertically through the spring, tending to prevent any lateral movement of the same under pressure. The same mode of procedure is adopted in the construction of the spring in a spiral form, that, on some occasions, may prove more desirable.

Car-springs thus constructed, with external, and corresponding internal, ribs, of the shape and form described, possess greater elasticity and certainty of action, under heavy pressure, are less liable to collapse and injury than those of ordinary construction, the web in each contributing to the strength of the spring, according to the size of the vertical web.

What I claim as my invention, and desire to secure by Letters Patent, is—

1. In a railway-car spring, the double ribs or projections $a\,a$ and $a'\,a'$, of circular or spiral form, when constructed or arranged in the manner and for the purpose herein described.

2. In a car-spring, the combination of the ribs $a\,a\,a'\,a'$, with the web $a''$ separating the two, in the manner and for the purpose herein described.

In testimony that I claim the foregoing as my own I affix my signature in presence of two witnesses.

DANIEL R. PRATT.

Witnesses:
 WM. H. MINNIX,
 B. F. JAMES.